(No Model.) 2 Sheets—Sheet 1.
H. M. NEER.
ELECTRIC MOTOR FOR STREET CARS.
No. 555,392. Patented Feb. 25, 1896.
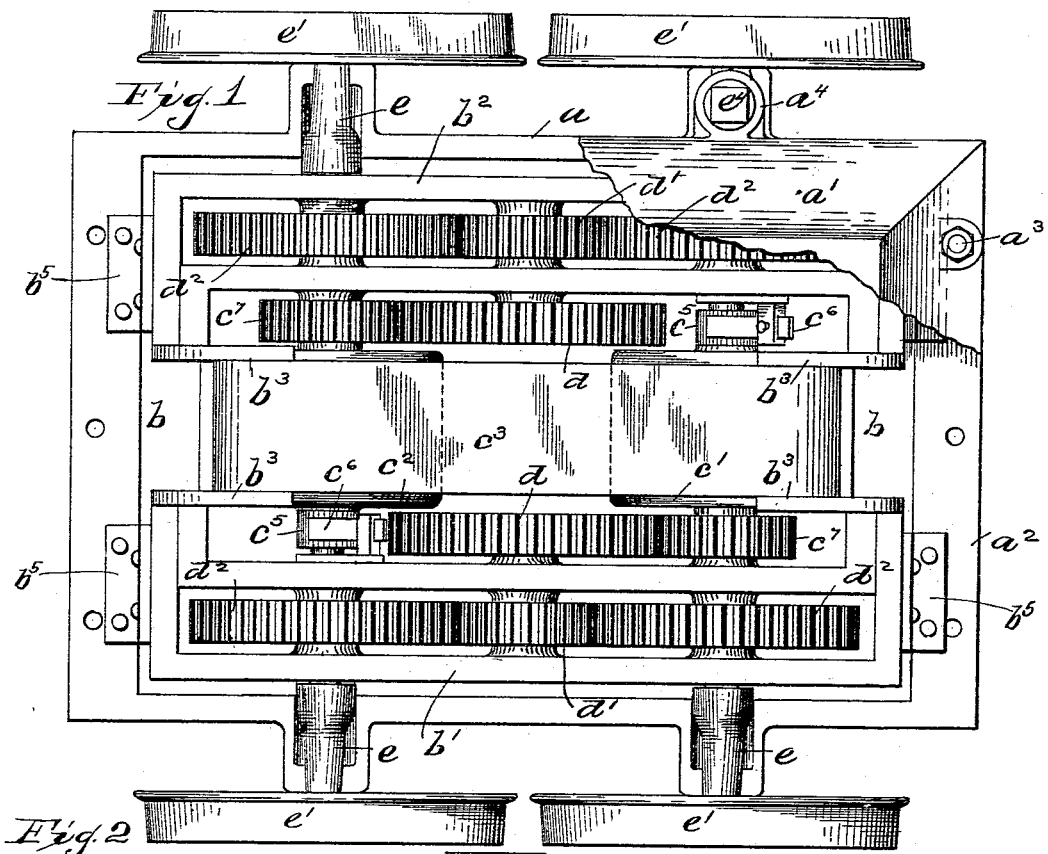
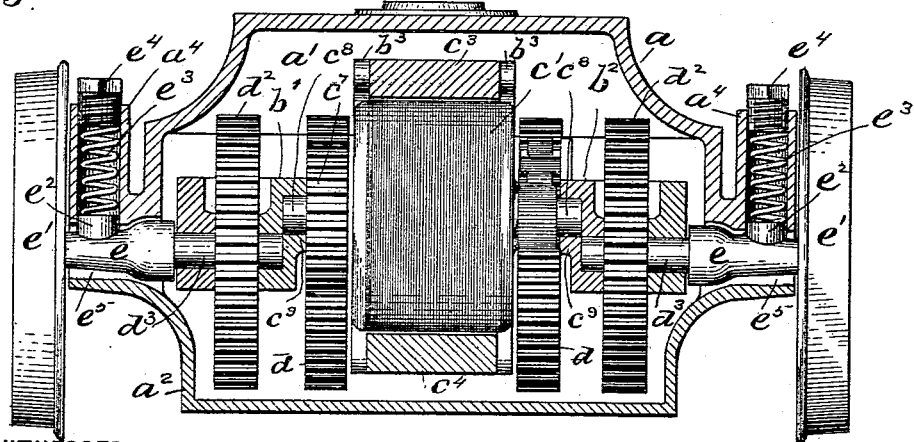
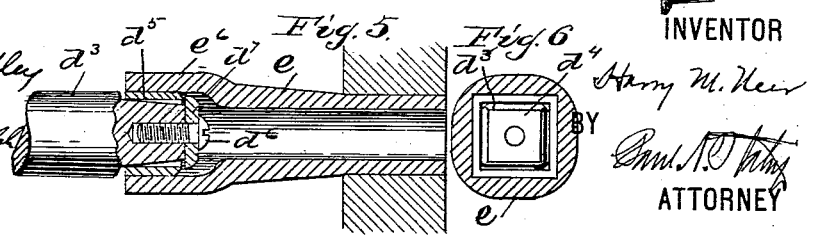
WITNESSES:  INVENTOR
G. M. Gridley  Harry M. Neer
Chas. J. Neter  BY
  Saml. N. D_____
  ATTORNEY (No Model.) 2 Sheets—Sheet 2.
H. M. NEER.
ELECTRIC MOTOR FOR STREET CARS.
No. 555,392. Patented Feb. 25, 1896.
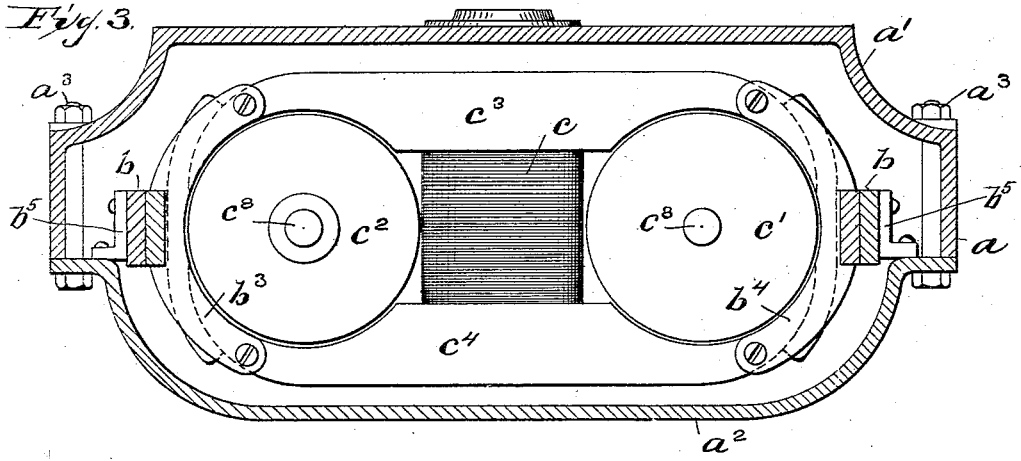
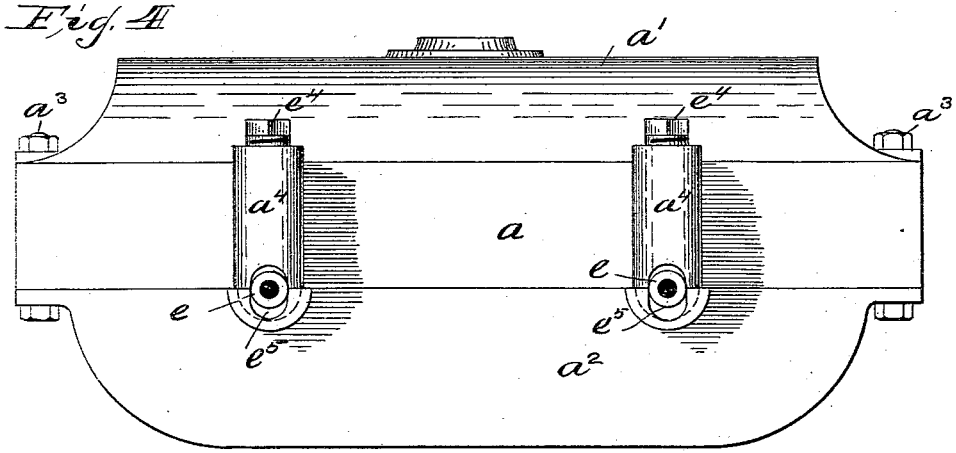
WITNESSES:
G. M. Gridley
Chas. I. Welch
INVENTOR
Harry M. Neer
BY
ATTORNEY

UNITED STATES PATENT OFFICE.

HARRY M. NEER, OF SPRINGFIELD, OHIO, ASSIGNOR OF ONE-HALF TO OLIVER S. KELLY, OF SAME PLACE.

ELECTRIC MOTOR FOR STREET-CARS.

SPECIFICATION forming part of Letters Patent No. 555,392, dated February 25, 1896.

Application filed April 25, 1895. Serial No. 547,111. (No model.)

*To all whom it may concern:*

Be it known that I, HARRY M. NEER, a citizen of the United States, residing at Springfield, in the county of Clark and State of Ohio, have invented certain new and useful Improvements in Electric Motors for Street-Cars, of which the following is a specification.

My invention relates to improvements in electric motors for street-cars; and it consists in the various constructions and combinations of parts hereinafter described and claimed.

In the accompanying drawings, Figure 1 is a plan view, partly broken away, of a device embodying my invention. Fig. 2 is a vertical sectional elevation of the same. Fig. 3 is a longitudinal section of the same, and Fig. 4 is a side elevation of the casing with the wheels removed. Figs. 5 and 6 are details of the axle connections.

Like parts are represented by similar letters of reference in the several views.

In the said drawings, $a\,a$ represent an outer casing, which is constructed of two parts $a'$ and $a^2$, secured together by bolts or other suitable connecting devices $a^3$. Within the outer casing is a supporting-frame $b\,b$. This frame $b\,b$ is made of two parts $b'\,b^2$, which are supported on the casing by projections $b^5$. Between the respective frame parts $b'\,b^2$ are arranged the field-magnet and the armatures, there being a single field-magnet $c$ and two armatures $c'\,c^2$. The field-magnet is provided with extended poles, which consist of bars $c^3$ $c^4$ extending laterally from the field-magnet in opposite directions so as to project over and partly surround the armatures $c'\,c^2$ on opposite sides thereof. To these pole-bars $c^3\,c^4$ are bolted or otherwise secured the frame parts $b'\,b^2$ of the supporting-frame $b$, said frame parts being provided with extended arms or lugs $b^3\,b^3$ for this purpose.

Each of the armatures is provided at one end with the usual commutator $c^5$ and brushes $c^6$ and at the opposite end with a pinion $c^7$, the brushes and pinions of the respective armatures being arranged opposite each other. Thus the pinion of one armature is on the same side as the brush of the opposite armature. The armature-shafts $c^8$ are supported in suitable bearings $c^9$ in the respective frame parts $b'\,b^2$, and the pinions $c^7$ are each in mesh with a spur-gear $d$ on a short shaft, which carries a spur-pinion $d'$, which meshes with gears $d^2\,d^2$ on the opposite sides thereof. These spur-gears $d^2$ are mounted on short shafts $d^3$, the ends of which are shouldered down and squared, as shown at $d^4$, and adapted to fit in square sockets $d^5$ in the ends of hollow stub-axles $e$. (See Figs. 5 and 6.) To these stub-axles $e$ are secured the driving and supporting wheels $e'$.

Above each of the stub-axles $e$ is a bearing seat or support $e^2$, on which rests a spring $e^3$, the opposite end of which is in contact with a screw-threaded block or seat $e^4$, which screws into the end of a pocket $a^4$ formed in the outer casing $a\,a$, the bearing-support $e^2$ being also adapted to fit loosely in said pocket.

The square end $d^4$ of the shaft $d^3$ is tapered where it fits into the socket $d^5$, so that the frame may rise and fall with reference to the axles, the movement being compensated by the loose joint between the short shaft $d^3$ and the hollow stub-axle $e$, as described. The stub-axles $e$ project through slotted openings $e^5$ in the sides of the outer casing, which will permit said casing to rise and fall with reference to said axles. The stub-axles are preferably enlarged, as shown at $e^6$, to receive the socket $d^5$, the openings $e^5$ being formed partly in the upper and lower portions $a'\,a^2$ of the outer casing.

In Fig. 5 I have shown a screw $d^6$ tapped into the end of the axle $d^3$ and having a projecting head or washer $d^7$ to extend beyond the end of the socket $d^5$, which is rounded off to permit the vibration of the axle $d^3$ and thus hold the parts together. This construction, while desirable, is not essential, as the parts will be held in their proper operative positions by the outer casing.

It will be seen from the above description that I have provided a motor of an extremely simple construction. Each side of the frame and its gearing is practically independent of the other side. One of the armatures is connected to the driving-wheels on one side of the motor and the other armature connected to the driving-wheels on the opposite side, while both armatures are operated from a single field-magnet. The spring-pockets being formed in the outer casing, which also carries the supporting-frame of the motor, the entire operative mechanism is supported from the stub-axles on the springs $e^3$, the tension of the springs being adapted to be adjusted by the screw-threaded seats $e^4$.

The arrangement of the stub-axles and the driving-shafts with the sockets, as described, produces a universal joint, which permits the necessary movement of the frame with reference to said axles to permit the yielding of said springs, and at the same time forming a positive driving connection between said stub-axles and motors.

The arrangement of the field-magnet between the two armatures with the extended poles permits me to keep the motor central in the frame and at the same time apply the power evenly to the two armatures, which, being geared to the wheels on opposite sides of the motor, permit the said wheels to turn independently in passing curves or in changing direction.

Having thus described my invention, I claim—

1. The combination with an outer casing and an inner supporting-frame, track-wheels having stub-axles extending through said casing, and a motor supported on said frame, universal joints between said stub-axles and motor-shaft, and springs between said casing and axles, substantially as specified.

2. In a motor, a supporting-frame, a field-magnet supported centrally in said frame, and independent armatures arranged on each side of said field-magnet, track-wheels on each side of said field-magnet, said track-wheels being geared independently to the respective armatures, springs between said frame and track-wheels and a yielding driving connection from said armatures to said track-wheels, substantially as specified.

3. The combination with a supporting-frame, and an outer casing, a motor consisting of a single field-magnet and two armatures supported on said frame, and track-wheels connected to said armatures, the track-wheels on opposite sides of said frame being connected to the different armatures, as described, an outer casing supporting said frame, and springs between said casing and track-wheels, substantially as specified.

4. The combination with independent armatures, and a centrally-arranged field-magnet having extended poles for said armatures, track-wheels on each side of said field-magnet having stub-axles geared to said armatures, universal connections between said axles and armatures, a supporting-casing, and springs between said casing and axles, substantially as specified.

5. The combination with a frame, and a motor, as described, stub-axles having square sockets, and motor-shafts having square projections to slip into said sockets, said projections being tapered, as described, and springs between said frame and stub-axles, substantially as specified.

6. The combination with a motor and motor-frame, stub-axles having enlarged sockets, and motor-shafts having tapered projections to fit in said sockets, spring-cases in said frame, springs in said cases, and adjustable supports for said springs, substantially as specified.

In testimony whereof I have hereunto set my hand this 20th day of April, A. D. 1895.

HARRY M. NEER.

Witnesses:
CHAS. I. WELCH,
GEORGE BOHNENKEMPER.